G. D. PEARSON.
TIRE.
APPLICATION FILED DEC. 23, 1916. RENEWED DEC. 10, 1919.
1,345,228.
Patented June 29, 1920.
2 SHEETS—SHEET 1.
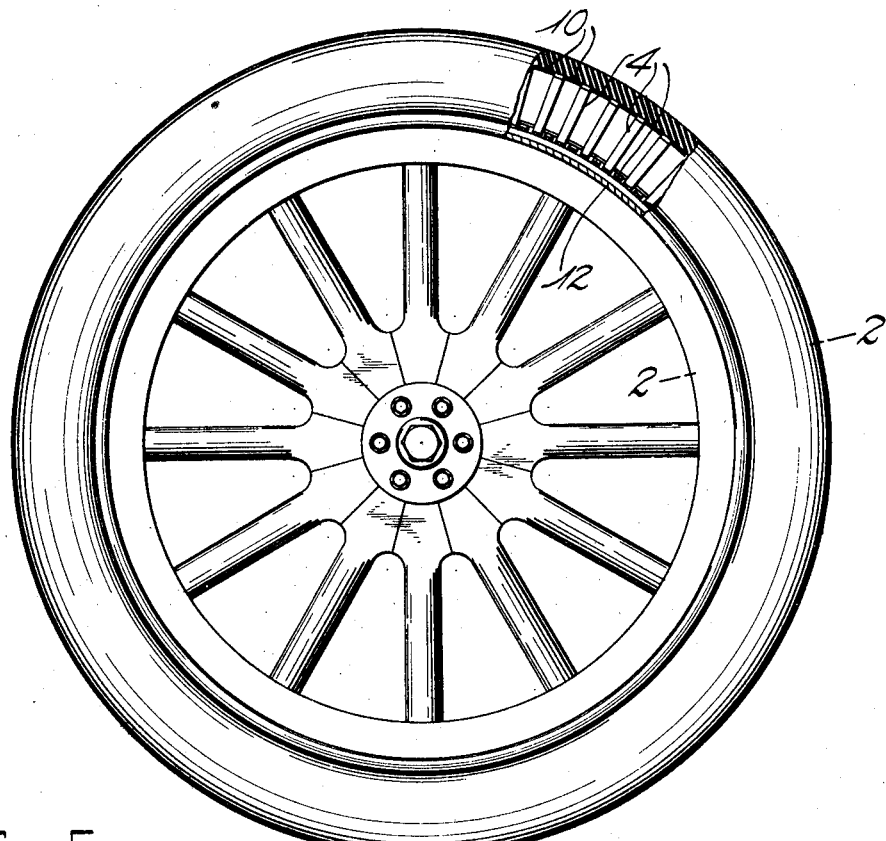
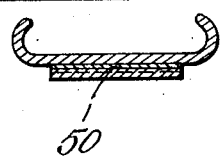
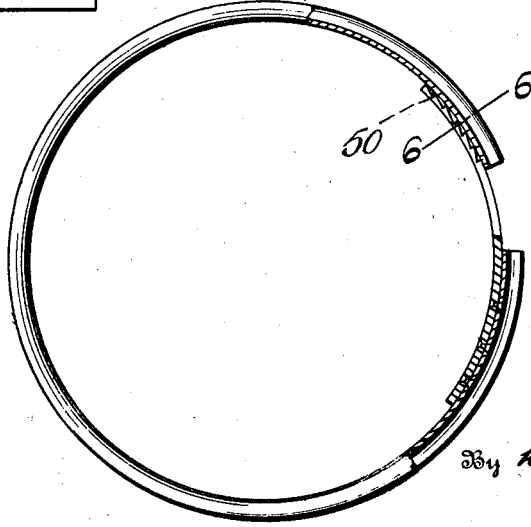

G. D. PEARSON.
TIRE.
APPLICATION FILED DEC. 23, 1916. RENEWED DEC. 10, 1919.
1,345,228.
Patented June 29, 1920.
2 SHEETS—SHEET 2.
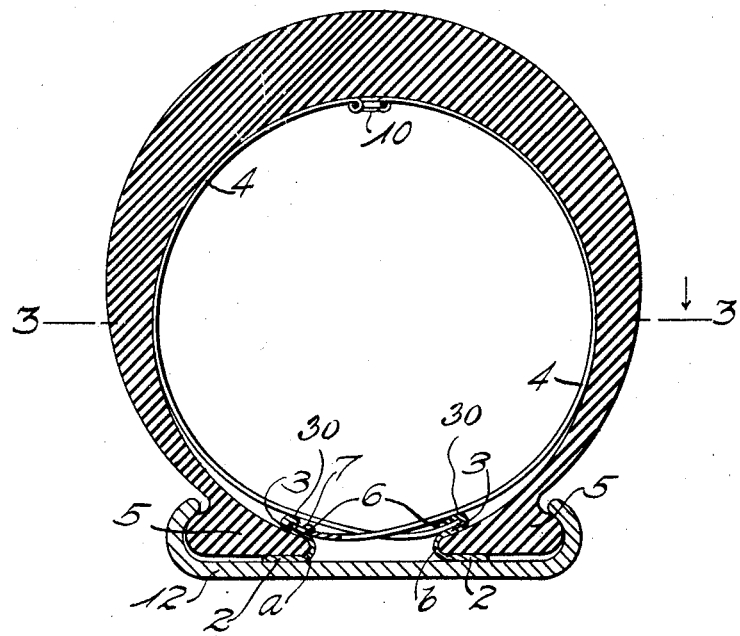
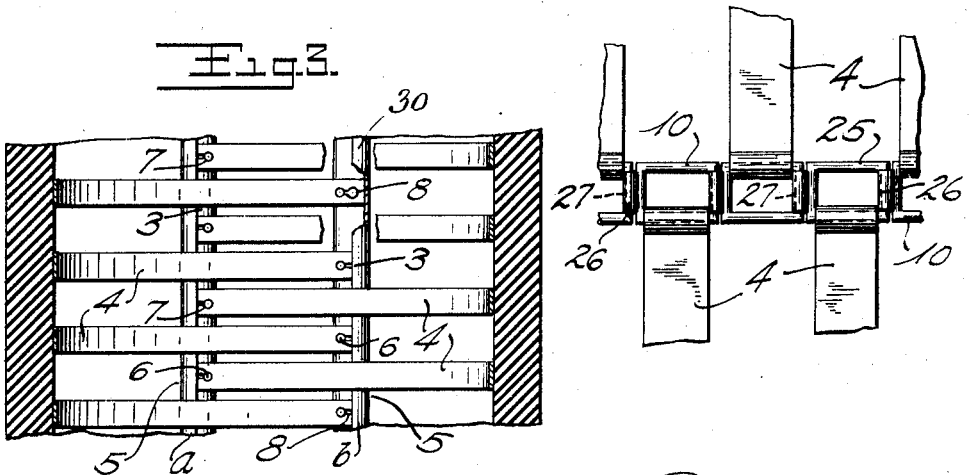
Inventor
George D. Pearson
By his Attorney

UNITED STATES PATENT OFFICE.

GEORGE D. PEARSON, OF MONTREAL, QUEBEC, CANADA.

TIRE.

1,345,228.     Specification of Letters Patent.     Patented June 29, 1920.

Application filed December 23, 1916, Serial No. 138,651. Renewed December 10, 1919. Serial No. 343,814.

*To all whom it may concern:*

Be it known that I, GEORGE D. PEARSON, of the city of Montreal, Province of Quebec, Dominion of Canada, have invented certain new and useful Improvements in Tires; and I do hereby declare that the following is a full, clear, and exact description thereof.

My invention relates particularly to tires of the non-puncturable type and has for its object to produce a tire of this nature which will be non-collapsible.

Heretofore considerable money has been spent in attempting to produce a tire which is non-puncturable and at the same time suitable for general use, but the difficulties experienced have been that the tire was either too heavy or not sufficiently resilient and in some instances would be liable to collapse and be ripped from the rim if subjected to lateral strains such as produced by skidding. My invention overcomes these difficulties and consists of a pair of metal rings of suitable form to engage the rim within the outer casing each ring having a series of bow-springs connected thereto at one end, the springs of one ring alternating with the springs of the other; while the outer ends of the springs at each side are hingedly connected to the alternate links of a chain. The effect is that a compression exerted at any point in the tire will be transmitted uniformly throughout the same in substantially the same manner as with inflated inner tubes while the particular alternate arrangement of the springs and connection along the circumferential center of the tire causes the pressure on the tread to tend to force the rings more firmly into the rim of the wheel.

For full comprehension, however, of my invention, reference must be had to the accompanying drawings in which similar reference characters indicate the same parts, and wherein:—

Figure 1 is a side elevation of an automobile wheel with my improved invention applied thereto, a portion of the outer casing being broken away;

Fig. 2 is a transverse sectional view taken on line 2—2 Fig 1;

Fig. 3 is a horizontal sectional view taken on line 3—3 Fig. 2;

Fig. 4 is a fragmentary view of the connection between the outer ends of the springs;

Fig. 5 is a side elevation partly in section of the adjustable rim; and

Fig. 6 is a sectional view taken on line 6—6 Fig. 5.

The rings $a$ and $b$ of my improved tire each consist of a flat metal member bent back upon itself to present a flange 2 conforming to the edge of the attachment portion 5 of the outer case and a flange 3 to which the springs, 4, are attached this flange 3 having a turned-back lip 30. The springs carried by each ring are spaced a sufficient distance apart to have the respective series interdigitate. The connection between the springs and rings must be such that there will be no danger of accidental disconnection and must also be such that individual springs may be removed and replaced by others at will. The connection I prefer in the present embodiment of my invention is a series of pins 6 with heads 7 carried by the inner surface of the flange 3 and the corresponding ends of the springs have key-hole slots 8. This means of attachment permits the ends of the springs to be inserted between the flange 3 and lip 30, and the keyhole slots to be fitted over the pins, the larger end of the slot being toward the end of the spring in order that the end of the spring may be then forced into the space between the flanges 3 and 30. The connection between the outer ends of the springs consists of a chain made up of links 10, of oblong form with side bars and one end bar the opposite end being in the form of a wide hook engaging the end bar of the next link in the chain. The springs are hingedly connected to the side bars of these links the springs of one carrier ring being connected at one side of the chain to each alternate link and the springs of the other ring are connected at the opposite sides of the links alternating with those to which the first-mentioned springs are connected. Fig. 4 shows this arrangement.

The carrier rings correspond in diameter and are of right-hand and left-hand form. As the springs are connected along the circumferential line of the tire and at their opposite ends to the respective rings, any lateral or centripetal pressure tends to separate the rings with the result that the tire is held more firmly in the rim. This combination and particular arrangement of parts constitutes, therefore, means whereby the effectiveness of the connection of the tire to the rim increases in proportion to the stress to which the tire is subjected and particularly lateral stress due to skidding or a tendency to skid. Another distinctive feature of this tire is that while embracing the novel features just mentioned it obtains a distribution of stress exerted on any point of the tire throughout the entire circumference thereof.

My improved tire is connected to the rim of the wheel, indicated at 12, simply by the inherent resiliency of my tire. The flanges 2 of my tire which conform to the usual beads or attachment hooks along the edges of the outer casing, fit snugly in place.

The chain connecting the outer ends of the springs preferably consists of oblong rectangular open links 25 having a hook 26 formed integrally with one end, and the hook of each link embraces the cross-bar at the opposite end of the adjoining link. The springs are connected to the side bars of these links which are preferably of such length that the side bar is fully occupied by the spring; and each spring is preferably connected to an individual link those of the two series alternating and are connected alternately to the links of the chain. This connection of the springs provides maximum flexibility and at the same time is effective in transmitting the strain upon any link through the other links circumferentially around the wheel and through the springs to the rim.

The rim must be of variable diameter and capable of being contracted and expanded. To mount my tire in the rim the springs, 4, are detached from the carrier rings and the carrier rings are fitted on to the edges of the outer case. The springs are then set in place, after which the rim is reduced, the tire fitted thereover, and finally the rim is expanded to the normal diameter in the usual way, and is held in its maximum diameter by the ratchet teeth 50 on the overlapping portion of the rim, the inherent contractional power of the tire and the resistance to it by the wheel have the effect of locking the rim 12 in its expanded position.

What I claim is as follows:—

1. In a tire, the combination with a pair of annular carriers, of two series of bow-springs carried by the respective carriers and having their outer ends united in the circumferential line of the tire and having their opposite ends crossing the central plane of the tire at right angles to the axis thereof and the ends of one series being secured to one carrier and the ends of the other series to the other carrier.

2. In a tire, the combination with a pair of laterally displaceable annular carriers, of two series of bow-springs removably carried by the respective carriers and united in the circumferential line of the tire, the springs of one series being located between the radial planes of the springs of the other series.

3. In a tire, the combination with a pair of laterally displaceable annular carriers, of two series of bow-springs carried by the respective carriers and united in the circumferential line of the tire, the springs of both series having key-hole slots in their ends attached to the carriers and the carriers having headed pins for engagement by the slotted springs.

4. In a tire the combination with a pair of laterally displaceable annular carriers, of two series of semi-circular bow-springs removably carried by the respective carriers, and located on opposite sides of the central plane of the tire at right angles to the axis, and a chain uniting the outer ends of the springs of the respective series.

5. In a tire the combination with a pair of laterally displaceable annular carriers, of two series of bow-springs removably carried by the respective carriers and a chain uniting the outer ends of the springs of the respective series, the said chain consisting of links the sides of which are of bar form and have the ends of the springs connected thereto.

6. In a tire the combination with a pair of laterally displaceable annular carriers, of two series of bow-springs removably carried by the respective carriers and a chain uniting the outer ends of the springs of the respective series, the said chain consisting of links the sides of which are of bar form and have the ends of the springs connected thereto, each spring to an individual link and the springs of one series with the links to which they are connected alternating with the springs and the links of the other series.

7. A resilient metallic lining for a tire comprising two series of bow springs, the springs of one series being located between the radial planes of the springs of the other series, and a chain uniting the outer ends of the springs, in the circumferential line of the tire.

In testimony whereof I have signed my name to this specification in the presence of two witnesses.

GEORGE D. PEARSON.

Witnesses:
WILLIAM J. C. HEWETSON,
KARL CHARBOMMAN.